US011075383B2

(12) United States Patent
Yushin et al.

(10) Patent No.: US 11,075,383 B2
(45) Date of Patent: Jul. 27, 2021

(54) CARBON NANOTUBE ARRAY BONDING

(71) Applicant: Georgia Tech Research Corporation, Atlanta, GA (US)

(72) Inventors: Gleb Nikolayevich Yushin, Atlanta, GA (US); Kara Linn Evanoff, New Wilmington, PA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 0 days.

(21) Appl. No.: 15/858,566

(22) Filed: Dec. 29, 2017

(65) Prior Publication Data
US 2018/0145331 A1    May 24, 2018

Related U.S. Application Data
(60) Continuation of application No. 15/401,932, filed on Jan. 9, 2017, now Pat. No. 9,859,563, which is a
(Continued)

(51) Int. Cl.
| | |
|---|---|
| *H01M 4/00* | (2006.01) |
| *H01M 4/62* | (2006.01) |
| *C01B 32/168* | (2017.01) |
| *B82Y 40/00* | (2011.01) |
| *H01M 4/583* | (2010.01) |
| *H01M 4/133* | (2010.01) |
| *H01M 4/36* | (2006.01) |
| *H01M 10/0525* | (2010.01) |
| *B82Y 10/00* | (2011.01) |

(Continued)

(52) U.S. Cl.
CPC ............. *H01M 4/625* (2013.01); *B82Y 10/00* (2013.01); *B82Y 40/00* (2013.01); *C01B 32/168* (2017.08); *H01M 4/133* (2013.01); *H01M 4/366* (2013.01); *H01M 4/386* (2013.01); *H01M 4/583* (2013.01); *H01M 4/587* (2013.01); *H01M 10/0525* (2013.01); *B82Y 30/00* (2013.01); *C01B 2202/08* (2013.01); *C01B 2202/22* (2013.01); *Y02P 70/50* (2015.11); *Y02T 10/70* (2013.01); *Y10S 977/742* (2013.01); *Y10S 977/842* (2013.01); *Y10S 977/948* (2013.01)

(58) Field of Classification Search
CPC ..... B82Y 40/00; B82Y 10/00; Y02T 10/7011; H01M 4/133; H01M 4/366; H01M 4/625; H01M 10/0525
See application file for complete search history.

(56) References Cited

U.S. PATENT DOCUMENTS

| | | | |
|---|---|---|---|
| 9,394,165 B2 * | 7/2016 | Yushin | ................... B82Y 40/00 |
| 2002/0012846 A1 * | 1/2002 | Skotheim | ............ H01M 2/1673 |
| | | | 429/231.95 |

(Continued)

*Primary Examiner* — Cynthia H Kelly
*Assistant Examiner* — Monique M Wills
(74) *Attorney, Agent, or Firm* — Muncy, Geissler, Olds & Lowe, P.C.; Daniel Podhajny

(57) ABSTRACT

Material compositions are provided that may comprise, for example, a vertically aligned carbon nanotube (VACNT) array, a conductive layer, and a carbon interlayer coupling the VACNT array to the conductive layer. Methods of manufacturing are provided. Such methods may comprise, for example, providing a VACNT array, providing a conductive layer, and bonding the VACNT array to the conductive layer via a carbon interlayer.

18 Claims, 16 Drawing Sheets

Related U.S. Application Data continuation of application No. 15/199,091, filed on Jun. 30, 2016, now Pat. No. 9,543,586, which is a division of application No. 13/524,494, filed on Jun. 15, 2012, now Pat. No. 9,394,165.

(60) Provisional application No. 61/497,306, filed on Jun. 15, 2011.

(51) Int. Cl.
*H01M 4/38* (2006.01)
*H01M 4/587* (2010.01)
*B82Y 30/00* (2011.01)

(56) References Cited

U.S. PATENT DOCUMENTS

| | | | | |
|---|---|---|---|---|
| 2007/0048607 | A1* | 3/2007 | Nakashima | H01M 2/166 429/209 |
| 2008/0145752 | A1* | 6/2008 | Hirose | H01M 2/0285 429/164 |
| 2009/0201629 | A1* | 8/2009 | Lang | H01M 6/40 361/502 |
| 2011/0223493 | A1* | 9/2011 | Christian | H01M 4/505 429/344 |
| 2011/0236756 | A1* | 9/2011 | Joo | H01M 4/134 429/220 |
| 2012/0064409 | A1* | 3/2012 | Zhamu | B82Y 30/00 429/221 |
| 2012/0132849 | A1* | 5/2012 | Fan | H01M 4/0471 252/182.1 |
| 2012/0313591 | A1* | 12/2012 | Brambilla | B82Y 30/00 320/166 |

* cited by examiner

CARBON NANOTUBE ARRAY BONDING

CLAIM OF PRIORITY

The present application is a Continuation of U.S. patent application Ser. No. 15/401,932 entitled "Carbon Nanotube Array Bonding" filed Jan. 9, 2017, which is a Continuation of U.S. patent application Ser. No. 15/199,091 entitled "Carbon Nanotube Array Bonding" filed Jun. 30, 2016 (now U.S. Pat. No. 9,543,586, issued Jan. 10, 2017), which is a Divisional of U.S. patent application Ser. No. 13/524,494 entitled "Carbon Nanotube Array Bonding" filed Jun. 15, 2012 (now U.S. Pat. No. 9,394,165, issued Jul. 19, 2016), which claims priority to U.S. Provisional Application No. 61/497,306 entitled "Nanostructured Electrodes with Ultra-High Thermal Conductivity" filed on Jun. 15, 2011, each of which is expressly incorporated by reference herein.

BACKGROUND

Field

The present disclosure relates generally to carbon nanotube technology and the like, and more particularly to carbon nanotube array bonding.

Background

Vertically-aligned carbon nanotube (VACNT) arrays, sometimes referred to as VACNT "forests," have recently garnered attention for a variety of applications across different industries. In the energy storage industry, for example, VACNT arrays may be attached to current collector metal foils and used as battery electrodes. VACNT arrays offer an attractive platform for hosting anode and cathode active materials, such as Lithium in Li-ion battery cells. Improved battery electrodes are essential for high power applications in low- or zero-emission hybrid-electrical or fully-electrical vehicles, consumer electronics, energy-efficient cargo ships and locomotives, aerospace, and power grids. In the semiconductor industry, as another example, VACNT arrays may be integrated into various metal heat sink arrangements and used to improve heat dissipation by increasing the surface area in contact with a surrounding cooling medium. Improved heat dissipation is critical for modern and future semiconductor devices as power consumption and circuit densities continue to increase.

Widespread adoption of such devices has been impeded, however, by the heretofore inadequate conductor-VACNT interface structures in conventional designs. Conventional bonding techniques for attaching VACNT arrays to conductor surfaces of interest have in fact been one of the primary factors limiting performance. Many conventional designs attempt to grow VACNT arrays directly on metal surfaces as part of an in situ fabrication procedure. This approach suffers from several shortcomings as metal surfaces are not well-suited for use as carbon nanotube substrates. In particular, these structures tend to produce carbon nanotubes of poor quality and limited length. In most instances, the maximum achievable length is only on the order of about 100 nanometers or less.

Growing VACNT arrays on ceramics such as quartz, for example, provides for a more controlled fabrication process and produces better quality carbon nanotubes in the VACNT array. However, conventional techniques for transferring such VACNT arrays, once produced, to conductive surfaces of interest rely on materials that provide poor performance or are limited in their application (or both). For example, conventional bonding techniques in the semiconductor industry often use soft metals (e.g., gold) to interface VACNT arrays with metal (e.g., copper or aluminum) heat sink surfaces. The soft nature and typically low melting points for these materials facilitates bonding. For the same reasons, however, these materials are not well-suited for high-temperature applications. In addition, in some cases Li ions or other electrolyte species of Li-ion or other batteries may react with the underlying metals, causing corrosion or other type of degradation. This may limit or prevent the use of soft metal intermediate layers between VACNT and conductive current collector surfaces in many electrochemical energy storage applications.

High thermal and electrical conductivity of electrodes is desired for many energy storage applications because most of the battery degradation mechanisms have strong temperature dependencies. Local heating caused by moderately high current pulses may severely diminish battery cycle life. Sophisticated methods of thermal management that employ microfluidic channels incorporated within the battery to transport cooling fluids have been proposed to address this issue, but these approaches dramatically increase the cost and complexity of battery production. In semiconductor devices, there is an additional demand to remove heat efficiently from various junctions and to do so at elevated temperature. This demand is currently not met.

Accordingly, there remains a need in the art for improved conductor-VACNT interfaces and related methods of manufacture so that the full potential of VACNT-based devices may be realized.

SUMMARY

Embodiments disclosed herein address the above stated needs by providing improved conductor-VACNT interfaces, improved devices made therefrom, and methods of making and using the same.

In some embodiments, material compositions are provided that may comprise, for example, a VACNT array, a conductive layer, and a carbon interlayer coupling the VACNT array to the conductive layer. In other embodiments, methods of manufacturing are provided. Such methods may comprise, for example, providing a VACNT array, providing a conductive layer, and bonding the VACNT array to the conductive layer via a carbon interlayer.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the present invention are disclosed in the following description and related drawings directed to specific embodiments of the invention. The term "embodiments of the invention" does not require that all embodiments of the invention include the discussed feature, advantage, process, or mode of operation, and alternate embodiments may be devised without departing from the scope of the invention. Additionally, well-known elements of the invention may not be described in detail or may be omitted so as not to obscure other, more relevant details.

As discussed in the background above, conventional bonding techniques for attaching VACNT arrays to conductive surfaces of interest (such as metals, carbon, or metal-carbon composites) have been heretofore inadequate. Conventional techniques for growing VACNT arrays directly on these surfaces tend to produce carbon nanotubes of poor quality and limited length, while conventional techniques for attaching prefabricated VACNT arrays to these surfaces similarly suffer from poor performance and/or are limited in their application.

Accordingly, improved conductor-VACNT interface structures, techniques, and related methods of manufacture are provided herein that employ, among other features, a carbon interlayer configured to couple the VACNT array to a given conductive layer. This design provides for the scalable formation of ultra-thick electrodes and other devices that can utilize VACNTs as a structured nanoscale platform with unique performance advantages. The application of the VACNT architecture may provide several orders of magnitude improvements in thermal and electrical conductivities. Since the structures provided herein allow for the stable performance of a typically unstable material, they offer an attractive substrate for the deposition of various high capacity or low electrical or thermal conductivity materials to provide high energy and power characteristics, high electrical and thermal conductivities, and stable cycling. In addition, they offer unique advantages for efficient heat removal in electronic devices, solar cells, and thermal energy harvesting devices operating at elevated temperatures or requiring improved electrical and thermal transport.

Figure 1:
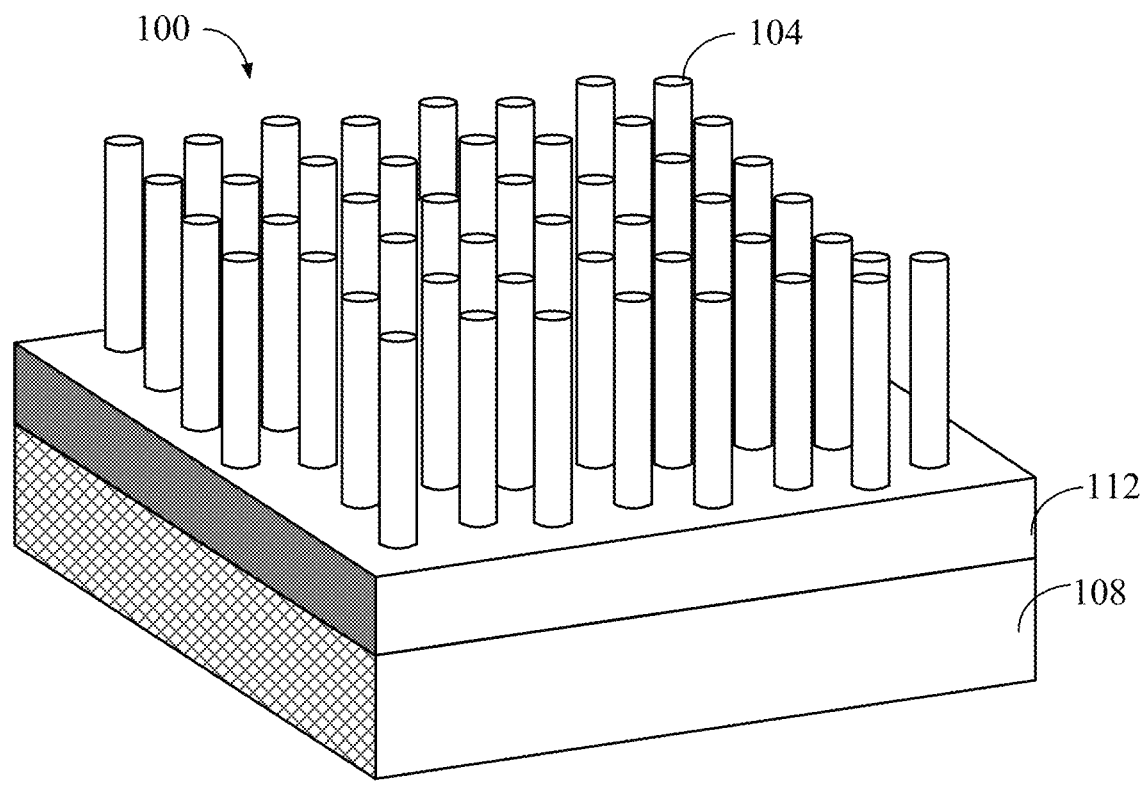
FIG. 1 is an aerial view illustrating an example conductor-VACNT interface structure employing a carbon interlayer according to one or more embodiments of the present invention.

FIG. 1 is an aerial view illustrating an example conductor-VACNT interface structure employing a carbon interlayer according to one or more embodiments of the present invention. As shown, the material composition 100 includes a VACNT array 104, a conductive layer 108, and a carbon interlayer 112 coupling the VACNT array to the conductive layer. The conductive layer 108 is generally a particular or composite layer of interest having a conductivity greater than about 100 S/m, such as various metals, carbon, or metal-carbon composites. The carbon interlayer 112 may be generally disposed between the VACNT array 104 and the conductive layer 108 to couple them together. However, it will be appreciated that the various layers may overlap in particular areas, with certain nanotubes in the VACNT array 104 penetrating the carbon interlayer 112 to various degrees. Some or all of the nanotubes in the VACNT array 104 may in fact directly contact the conductive layer 108 as well by penetrating through the carbon interlayer 112. The clean separation between layers shown in FIG. 1 is for illustration purposes only.

It has been found that conductor-VACNT interface structures of this type provide several advantages over conventional construction techniques. The carbon interlayer 112 provides, for example, improved thermal/electrical transfer performance at the conductor-VACNT interface, which has proven to be a key factor limiting performance of conventional carbon nanotube based devices. Compared to conventional fabrication techniques in which carbon nanotubes are grown on metal layers directly, the carbon interlayer 112 also provides improved adhesion, and allows for the production and incorporation of higher quality carbon nanotubes (e.g., having a greater degree of alignment and lower concentration of defects) into various electronic devices. This is achievable because the VACNT array 104 can be grown separately on a more suitable initial substrate (e.g., ceramics such as quartz, aluminum oxide, other metal oxides, etc.) and subsequently transferred to the conductive layer 108 via bonding with the carbon interlayer 112. In particular, longer carbon nanotubes, and hence, a thicker VACNT array 104, may be achieved (e.g., on the order of one to several millimeters in thickness), making the embodiments herein useful for a wider variety of applications than conventional designs.

The thickness of the carbon interlayer 112 may be tailored (e.g., by adjusting a deposition process reaction time) to fit a particular application as desired. However, for at least some applications, it has been found that a thickness for the carbon interlayer 112 of between about 50 nanometers (or approximately twice the diameter of the individual carbon nanotubes) and about 0.2 millimeters is desirable for stable operation. Below about 50 nanometers, the carbon interlayer 112 may not provide adequate bonding or thermal/electrical performance for some applications, while a thickness above about 0.2 millimeters may expose the carbon interlayer 112 to macro-scale mechanical stresses.

The particular material composition of the carbon interlayer 112 may also be tailored to fit various applications as desired. In some embodiments, the carbon interlayer 112 may be formed of a graphitic (sp2) carbon material, such as that produced by the carbonization of a polymer precursor (e.g., a polyvinylidene difluoride polymer, PVDF, or sucrose). In other embodiments, the carbon interlayer 112 may be formed of a polymer material itself, which may remain uncarbonized for certain applications, or a partially carbonized polymer.

For example, relatively low-temperature applications such as semiconductor heat sink devices may operate sufficiently with an uncarbonized or partially carbonized polymer material acting as the carbon interlayer 112. For elevated operating temperatures, however, such as those encountered in energy storage applications where the operating environment can reach temperatures in excess of 300° C., a carbonized graphitic material layer is generally more appropriate. In some embodiments, the carbonization temperature may be in the range of about 100° C. to about 900° C., depending on the conductive substrate used. In general though, the carbonization temperature should be at least several degrees below the melting temperature of the conductive substrate. In some embodiments, a carbonization catalyst (such as $H_2SO_4$, commonly utilized to catalyze carbonization of sucrose) may be used to lower the carbonization temperature.

It will be appreciated that different applications may use different conductive layers 108, but that the embodiments herein are applicable to a wide variety of such applications. For example, according to various embodiments, the conductive layer 108 may comprise aluminum, copper, nickel, silver, titanium, platinum, gold, carbon (graphitic carbon, including carbon nanotubes, bonded multi-layered graphene flakes, carbon paper, graphite foil, carbon fabric, turbostratic carbon, etc.), or other materials. In some embodiments, a carbon-based conductive layer 108 may be preferred over a metal layer due to better chemical resistance, lighter weight, in some cases higher AC electrical conductivity, higher modulus, higher strength, higher thermal stability, or different thermal expansion coefficient than metals.

For some applications and corresponding embodiments, one or more functional layers including additional materials may be deposited on the VACNT array 104 as desired.

Figure 2:
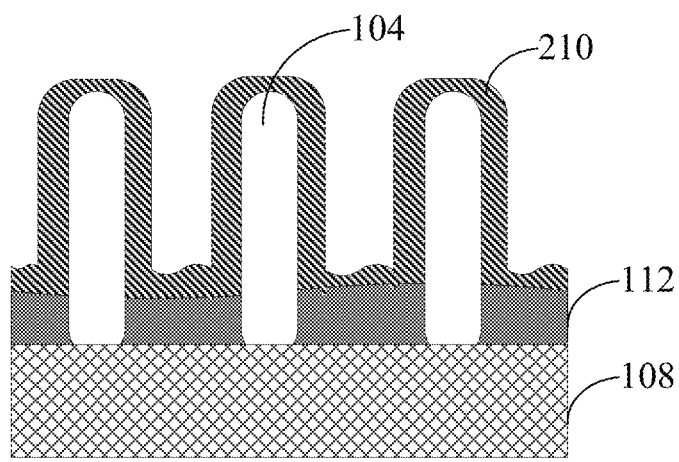
FIG. 2 is a cross-sectional view illustrating an example conductor-VACNT interface structure employing a functional layer according to further embodiments of the present invention.

FIG. 2 is a cross-sectional view illustrating an example conductor-VACNT interface structure employing a functional layer according to further embodiments of the present invention. Here, a functional layer 210 is disposed so as to at least partially coat the VACNT array 104. In some energy storage embodiments, for example, the functional layer 210 may correspond to a battery electrode active material functional layer (comprising, e.g., silicon, tin, germanium, carbon, phosphorous, lithium-containing oxides, lithium-free oxides, lithiated alloys thereof, etc., for anodes, or lithiated metal oxides, lithium-containing oxides, sulfur, sulfides, fluorides, silicates, other known cathode materials, etc., for cathodes). In these designs, the conductive layer 108 may accordingly correspond to a current collector foil or the like. In other embodiments, the functional layer 210 may correspond to a thermally conductive material (e.g., certain polymer fillers or the like) for improved heat dissipation. The thickness of the functional layer 210 may be tailored (e.g., by adjusting a deposition process reaction time) to fit a particular application as desired.

Figure 3:
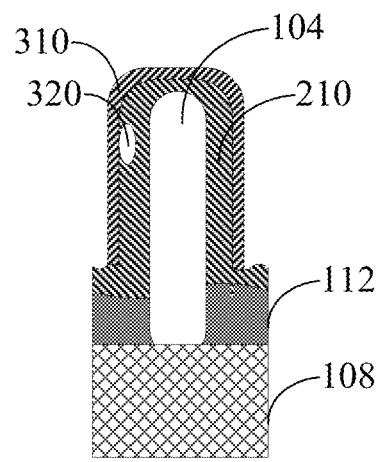
FIG. 3 is a cross-sectional view illustrating an example conductor-VACNT interface structure employing a composite functional layer according to still further embodiments of the present invention.

FIG. 3 is a cross-sectional view illustrating an example conductor-VACNT interface structure employing a composite functional layer according to still further embodiments of the present invention. Here, the functional layer 210 serves as an inner functional layer, and is itself coated with an outer functional layer 310, which may be advantageous for and tailored to various applications. For example, the outer functional layer 310 may correspond to an outer carbon layer, which has been shown to enhance performance and stability of various higher capacity material battery electrodes. As discussed in more detail below, when protected with an additional outer carbon layer, ultra-thick silicon-coated VACNT electrodes, for example, have been shown to exhibit stable performance at multiple current densities with reversible capacities significantly greater than graphite. In some designs, an outer carbon functional layer may additionally enhance the performance of the carbon interlayer 112. The thickness of the outer functional layer 310 may be tailored (e.g., by adjusting a deposition process reaction time) to fit a particular application as desired.

In some embodiments, the outer coating 310 itself may comprise multiple layers, including carbon, metal oxides, or metal halides. An outer layer of metal oxides or metal halides covering an outer carbon layer, or directly covering the functional layer material 210 on the VACNT array 104, may enhance performance. For example, wetting of some electrolytes (such as molten salts) may be poor on carbon but good on a metal oxide or metal halide layer. For these applications, the additional coating may be advantageous.

As is further illustrated in FIG. 3 by the example pore 320, in some designs additional porosity between the outer layer 310 and the functional layer 210 may be advantageous. For example, if the functional layer 210 expands during device operation, additional porosity provides space for such expansion. Porosity control is particularly important for some higher capacity active materials such as silicon, which experience significant volume fluctuations (up to 400% for some materials) during insertion and extraction of active ions, such as lithium (Li) in a Li-ion battery. Alternatively, in other applications, it might be advantageous to reduce the thermal or electrical transport between the functional layer 210 and the surroundings. In this case, formation of pores 320 between the outer functional layer 310 and the inner functional layer 210 provides such a function.

In this way, it will be appreciated that embodiments herein offer unique benefits for the scalable formation of ultra-thick electrodes, for example, which provide high thermal and electrical conductivity. Such benefits include straight and aligned pores for rapid ion transport, high thermal and electrical conductivity for high stability and long cycle life, high structure uniformity combined with more precise control over the dimensions of individual coated carbon nanotubes for predictable and reproducible performance, exceptionally smooth electrode surfaces (which allows for thinner separators), and control over electrode porosity achieved by electrode compression for the optimization of volumetric capacity and power characteristics.

The ability to produce thicker electrodes also allows designers to reduce the relative weight and volume of inactive components in a battery (e.g., separators, metal foils, etc.), or omit some components altogether. For example, in contrast to conventional designs that rely on a slurry containing nanoparticles of active material, embodiments herein may forgo using a binder, which further improves specific capacity and power performance. Other detrimental effects associated with such slurries may also be avoided, including the formation of cracks within the electrode during the slurry drying process caused by slow and uneven solvent evaporation, poor adhesion between the thick electrodes and metal current collectors, and the brittle behavior associated with conventionally produced thick electrodes. In addition, because battery active material precursors tend to be reactive with metal substrates, the ability to prefabricate the VACNT array 104 separately allows for improved deposition of the active material itself, before bonding with the corresponding current collector or the like.

Returning to FIG. 1, it will be appreciated that separate formation of the VACNT array 104 may be achieved in a variety of ways according to various embodiments. Recent developments in the rapid growth of VACNTs allow low-cost formation of 1 millimeter or longer, highly conductive tubes within minutes, making separate formation attractive.

Figure 4:
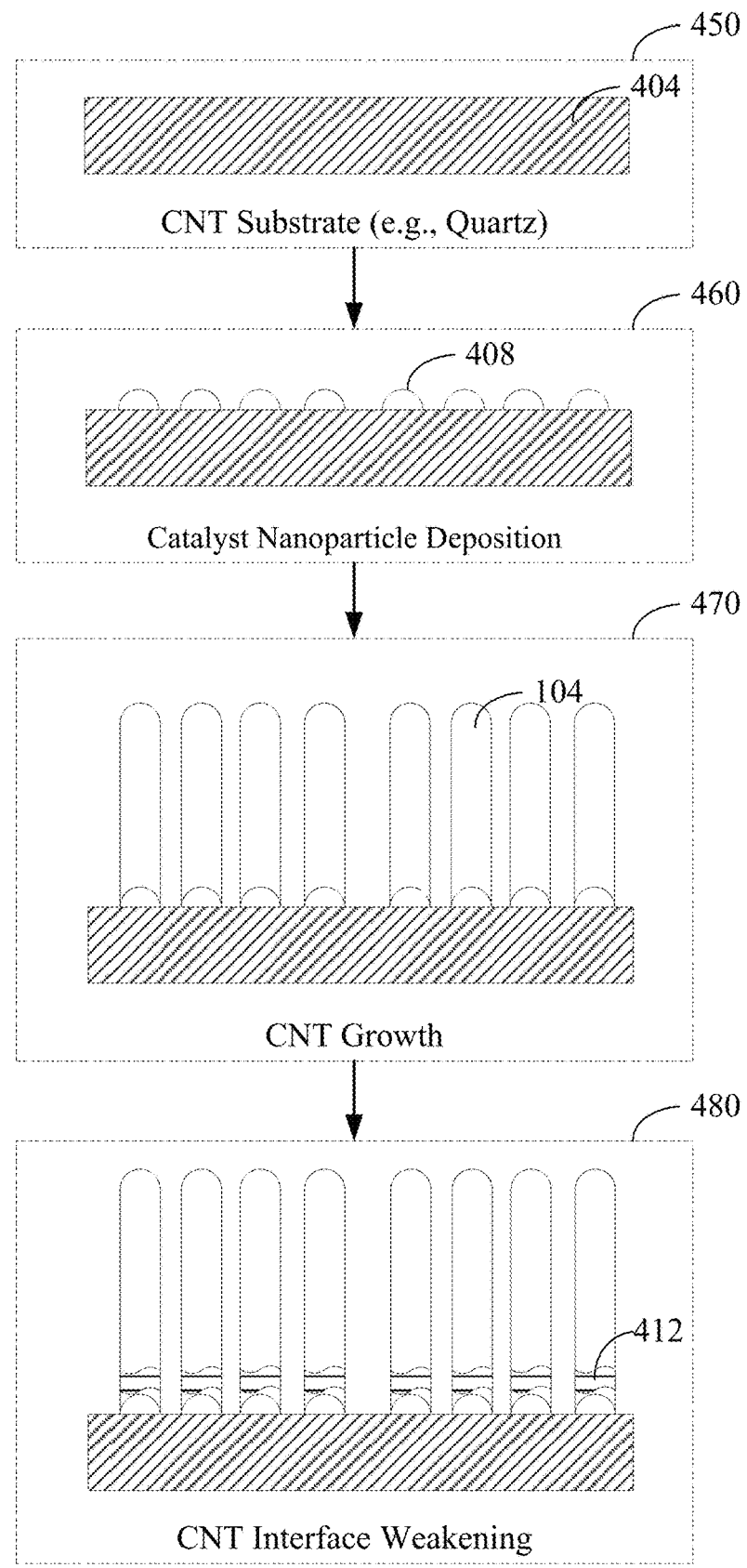
FIG. 4 is a graphical flow diagram illustrating an example process for forming a VACNT array according to one or more embodiments of the present invention.

FIG. 4 is a graphical flow diagram illustrating an example process for forming a VACNT array according to one or more embodiments of the present invention. As shown, the desired carbon nanotube (CNT) substrate 404 is initially provided on which to grow the VACNT array 104 (block 450). The substrate 404 may be a ceramic material, for example, such as quartz, aluminum oxide, other metal oxides, etc., which generally provides an advantageously smooth surface. Depending on the CNT precursor materials used, catalyst nanoparticles 408 may (or may not) be initially deposited on the substrate 404 as seeds for CNT growth (block 460). Upon activation (e.g., chemical vapor deposition, CVD, at elevated temperature and low pressure), the VACNT array 104 begins to grow (block 470). In preparation for transferring the VACNT array 104 to the conductive layer 108, its interface with the substrate 404 may be weakened at a desired location 412 (block 480). For example, the VACNT array 104 may be exposed to an oxidizing agent (e.g., $H_2O$ vapors at elevated temperatures) in the vicinity of the catalyst nanoparticles 408 on the substrate 404. Oxidizing the VACNT array 104 close to the substrate weakens its adhesion thereto. The VACNT array 104 is then easier to separate from the substrate 404 (e.g., mechanically, using an adhesive, etc.), and ready for subsequent transfer to the conductive layer 108.

Figure 5:
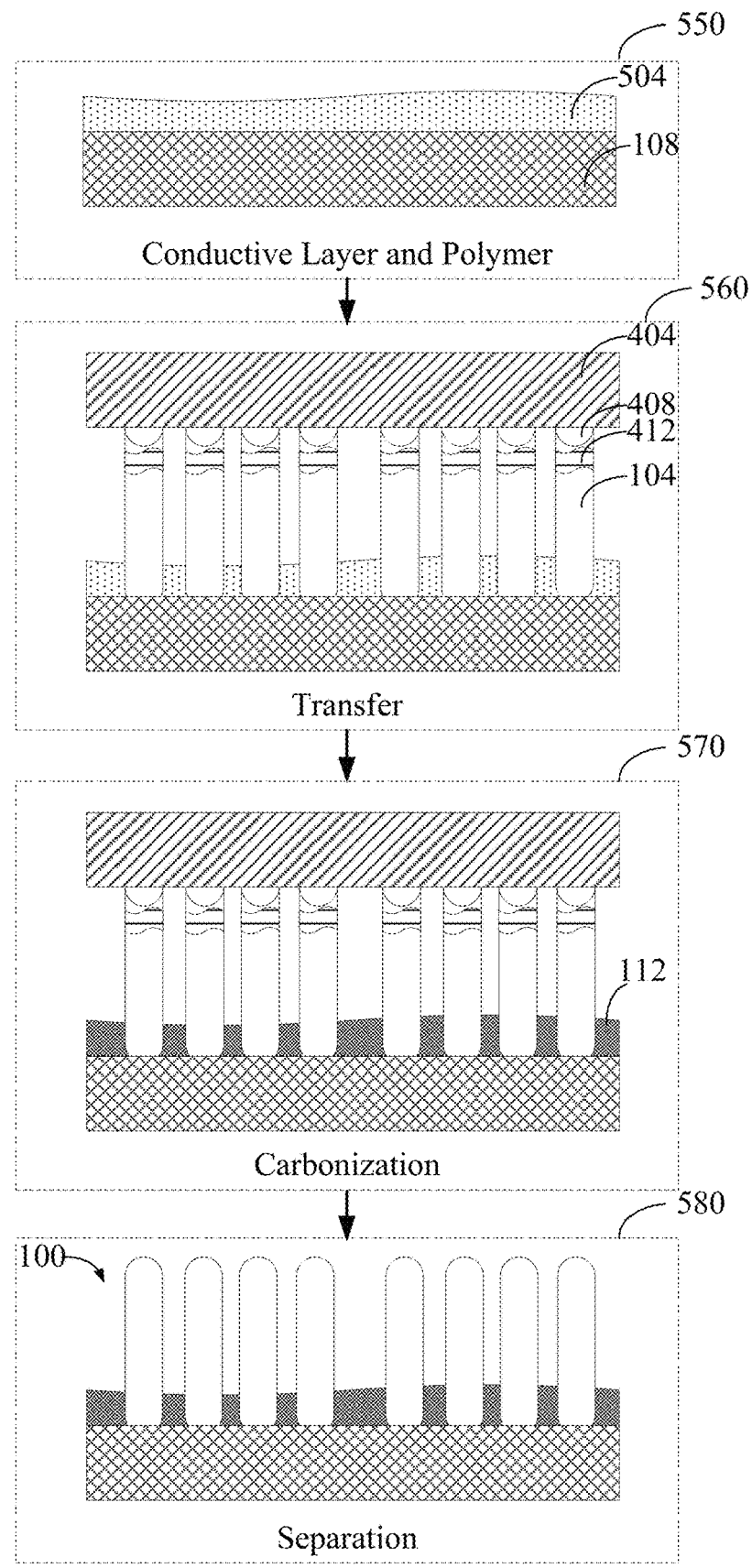
FIG. 5 is a graphical flow diagram illustrating an example transfer process for bonding a separately formed VACNT array to a desired conductive layer according to one or more embodiments of the present invention.

FIG. 5 is a graphical flow diagram illustrating an example transfer process for bonding a separately formed VACNT array to a desired conductive layer according to one or more embodiments of the present invention. As shown, the conductive layer 108 is initially prepared by coating it with a polymer adhesive layer 504 or the like (e.g., polyvinylidene difluoride, PVDF) (block 550). A separately grown VACNT array assembly, such as the one illustrated in FIG. 4, may then be transferred onto the polymer layer 504 (block 560).

In some designs, the polymer layer 504 itself may be used as the carbon interlayer 112. In other designs, however, the polymer layer 504 is carbonized (e.g., by exposure to elevated temperatures) to produce a graphitic material that serves as the carbon interlayer 112 (block 570). As discussed above, this may be advantageous for certain applications.

In either case, the resultant structure may be separated by removing the initial CNT substrate 404, along with any other precursor materials (e.g., the nanoparticle catalysts 408), to produce the conductor-VACNT bonded structure 100 illustrated in FIG. 1 (block 580). This again may be facilitated by weakening the interface between the VACNT array 104 and the substrate 404 at the desired location 412, and then applying one or more separation techniques (e.g., mechanical, adhesive, etc.).

It is noted that the order of operations in the flow diagram of FIG. 5 is shown by way of example only, and certain operations may be performed in other orders as desired. For example, the separation of the initial CNT substrate 404 from the VACNT array 104 may be performed prior to transferring the VACNT array 104 onto the conductive layer 108. It has been found that the Van der Waals forces between individual carbon nanotubes in the VACNT array 104 are sufficient in many instances to keep the structure intact and aligned during the transfer process.

For embodiments that include functional layers, the functional layer may be incorporated into the conductor-VACNT bonded structure 100 in a variety of ways. Several examples are discussed below.

Figure 6:
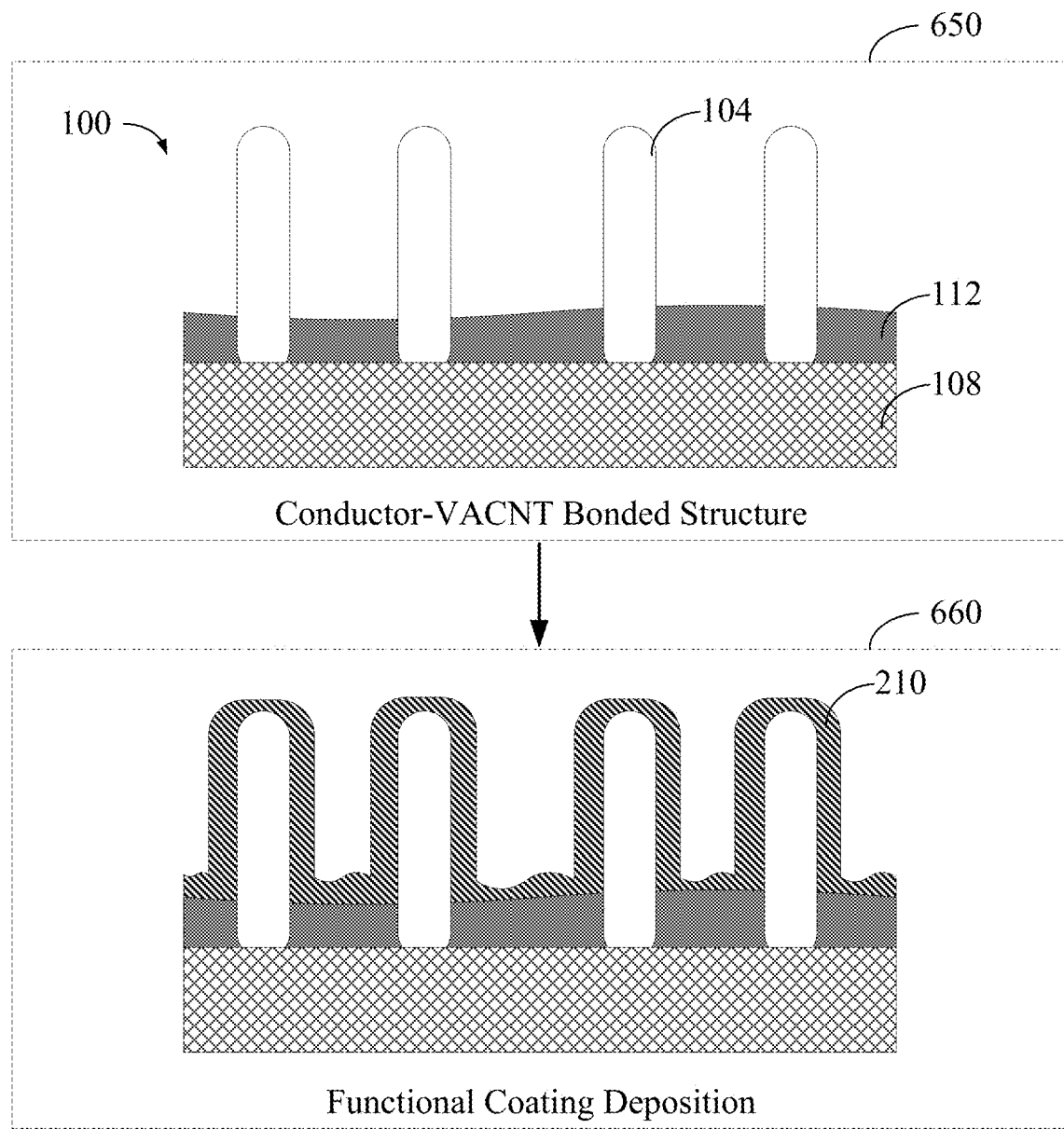
FIG. 6 is a graphical flow diagram illustrating an example process for forming a conductor-VACNT bonded structure with a functional layer according to one or more embodiments of the present invention.

FIG. 6 is a graphical flow diagram illustrating an example process for forming a conductor-VACNT bonded structure with a functional layer according to one or more embodiments of the present invention. In this example, the complete conductor-VACNT bonded structure 100 is provided (block 650) and coated with the desired functional layer 210 (block 660). For a silicon active material, for example, the coating may be achieved via silane ($SiH_4$) decomposition at elevated temperature (e.g., low pressure decomposition of a high purity $SiH_4$ at or near about 500° C.) or in other ways as desired. The vapor deposition of anode and cathode materials may allow for the formation of uniform coatings on the VACNT array 104 surface, although other deposition processes may be used as desired.

Figure 7A:
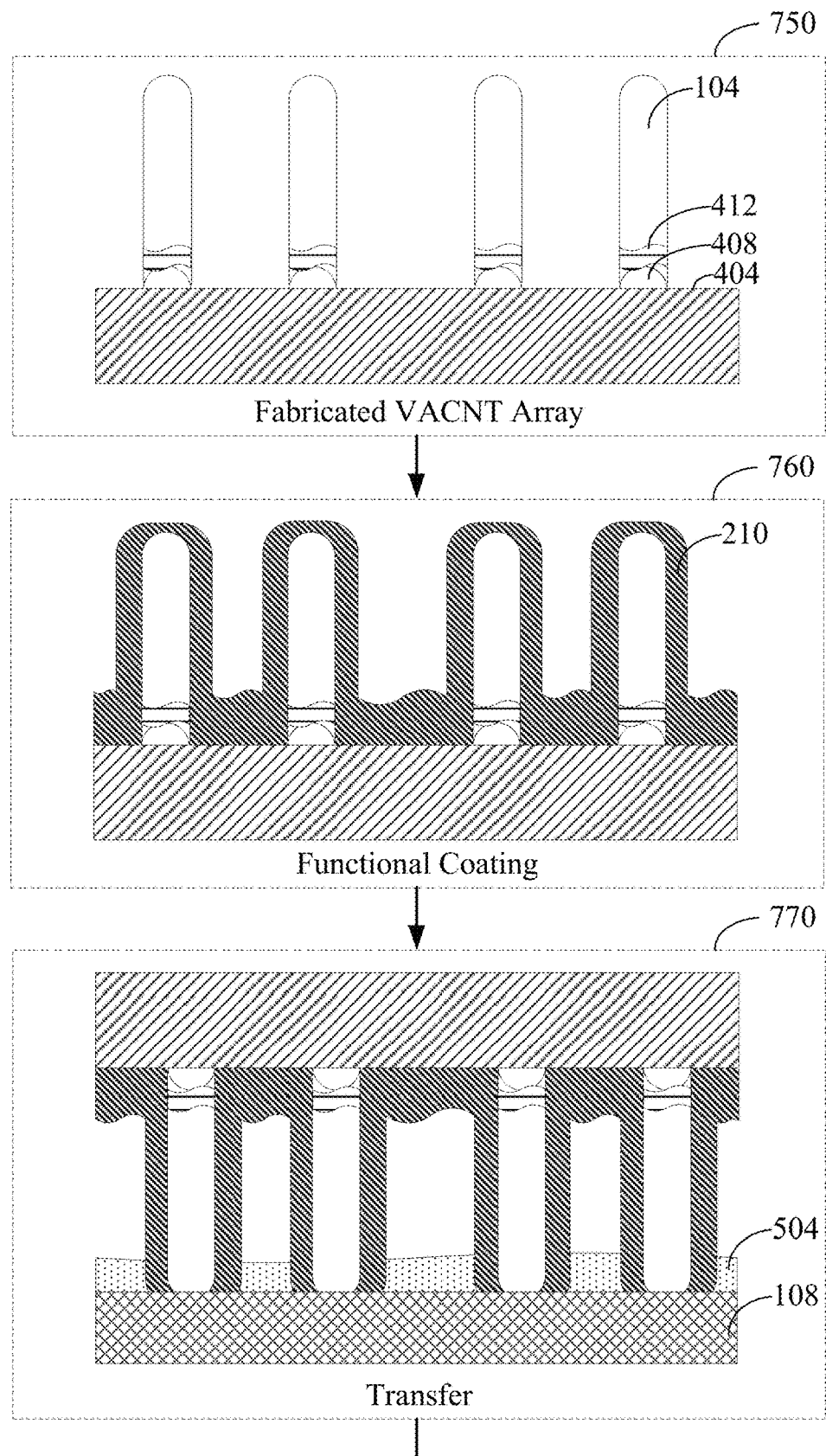
FIGS. 7A-7B are a graphical flow diagram illustrating another example process for forming a conductor-VACNT bonded structure with a functional layer according to other embodiments of the present invention.
Figure 7B:
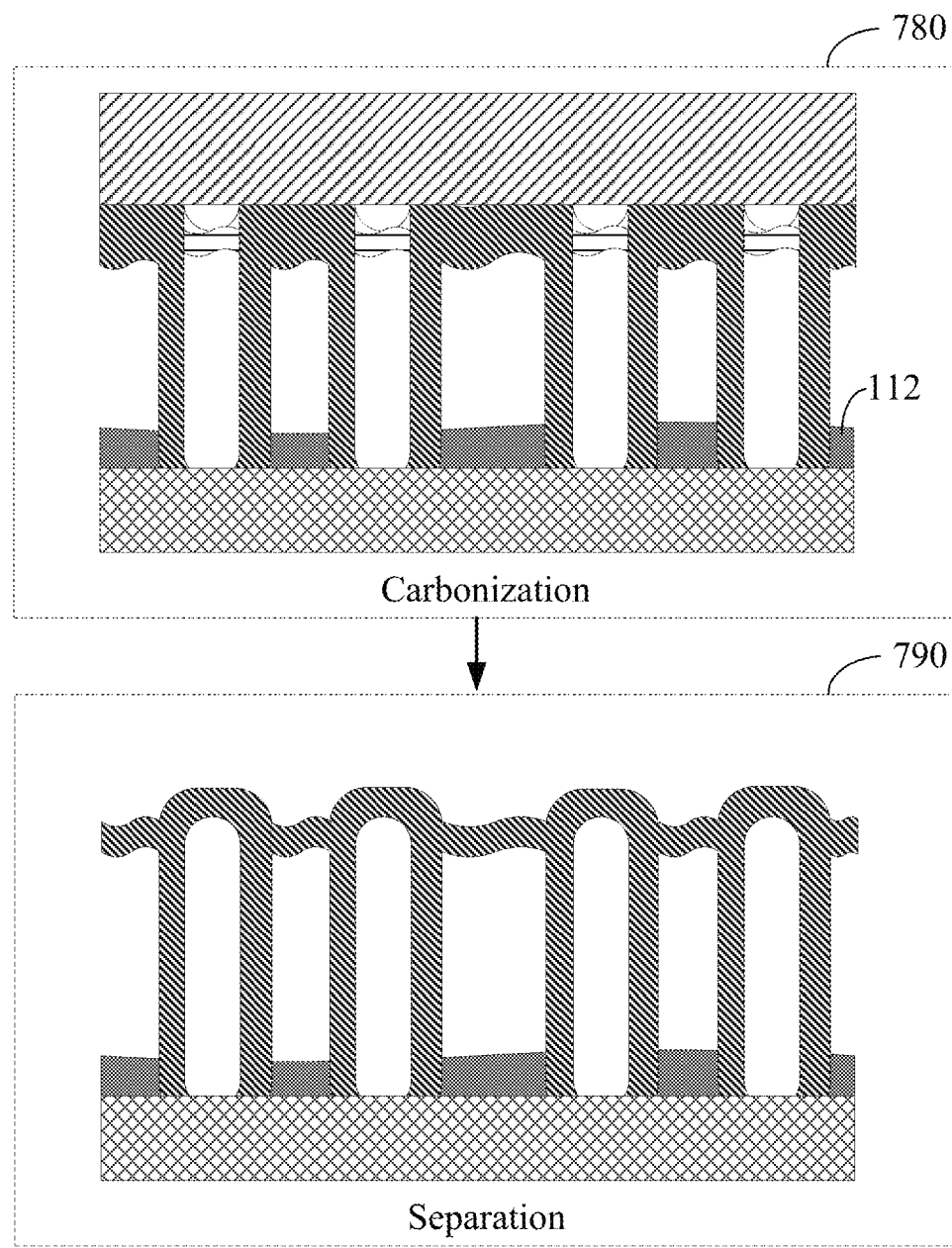

FIGS. 7A-7B are a graphical flow diagram illustrating another example process for forming a conductor-VACNT bonded structure with a functional layer according to other embodiments of the present invention. In this example, the functional layer 210 deposition is performed prior to transferring the VACNT array 104 from the initial CNT substrate 404. The deposition of active (functional) material may negatively affect important properties of the conductive layer 108. For example, some metals are highly reactive with gaseous precursors of the active materials at elevated temperatures. This may cause formation of carbides, oxides, sulfides, or halides on the metal surfaces. In some cases, the process of depositing a functional layer requires temperatures close to or above the melting point of a particular metal. For applications where this is undesirable, the deposition of the functional layer 210 prior to transferring the VACNT array 104 may be advantageous.

In particular, the initial CNT substrate 404 and VACNT array 104 grown thereon are provided (block 750) and coated with the desired functional layer 210 (block 760). The entire assembly may then be transferred (block 770), carbonized (block 780), and separated (block 790) as desired, similar to the procedures described above with respect to FIG. 5.

Figure 8A:
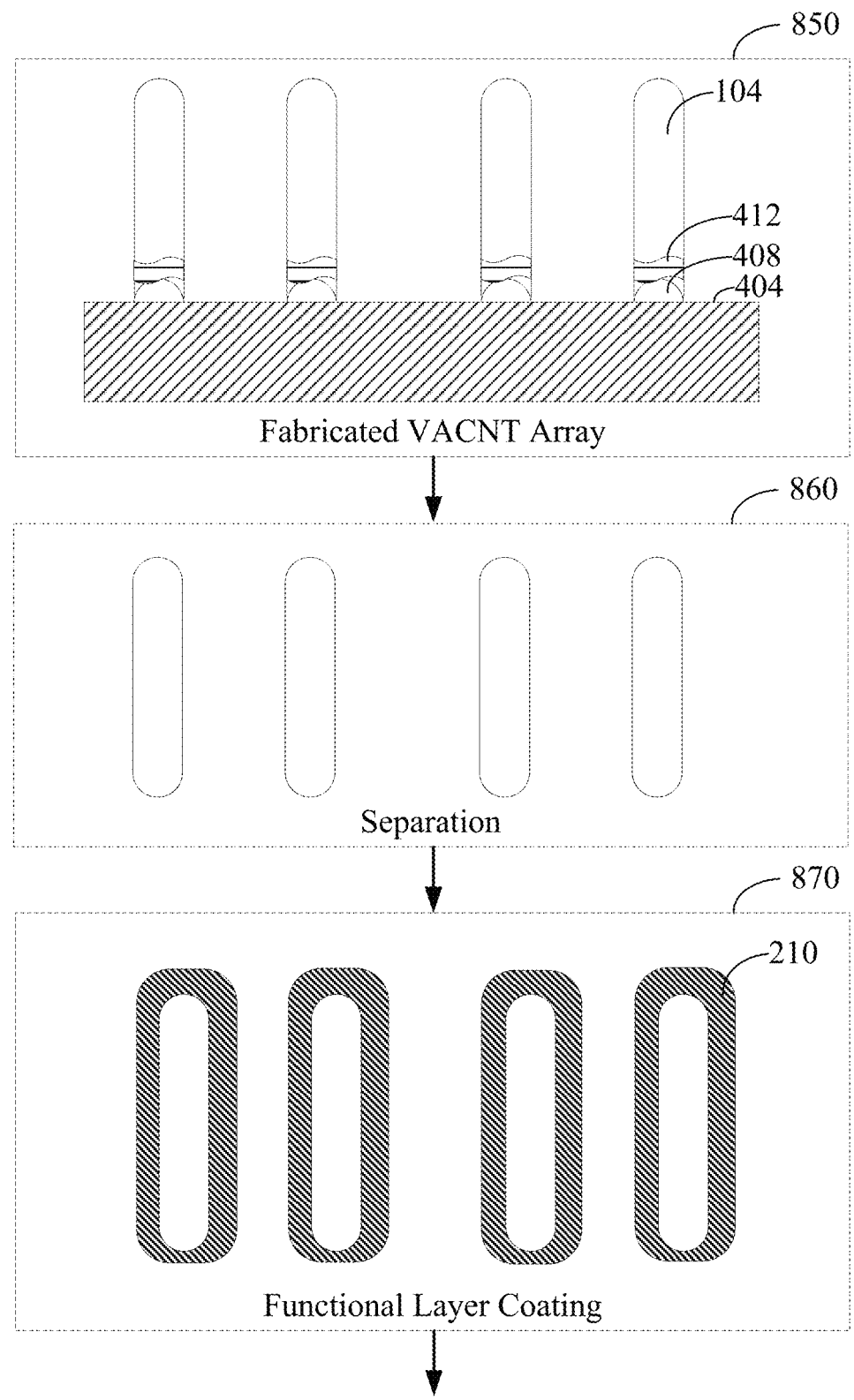
FIGS. 8A-8B are a graphical flow diagram illustrating another example process for forming a conductor-VACNT bonded structure with a functional layer according to still other embodiments of the present invention.
Figure 8B:
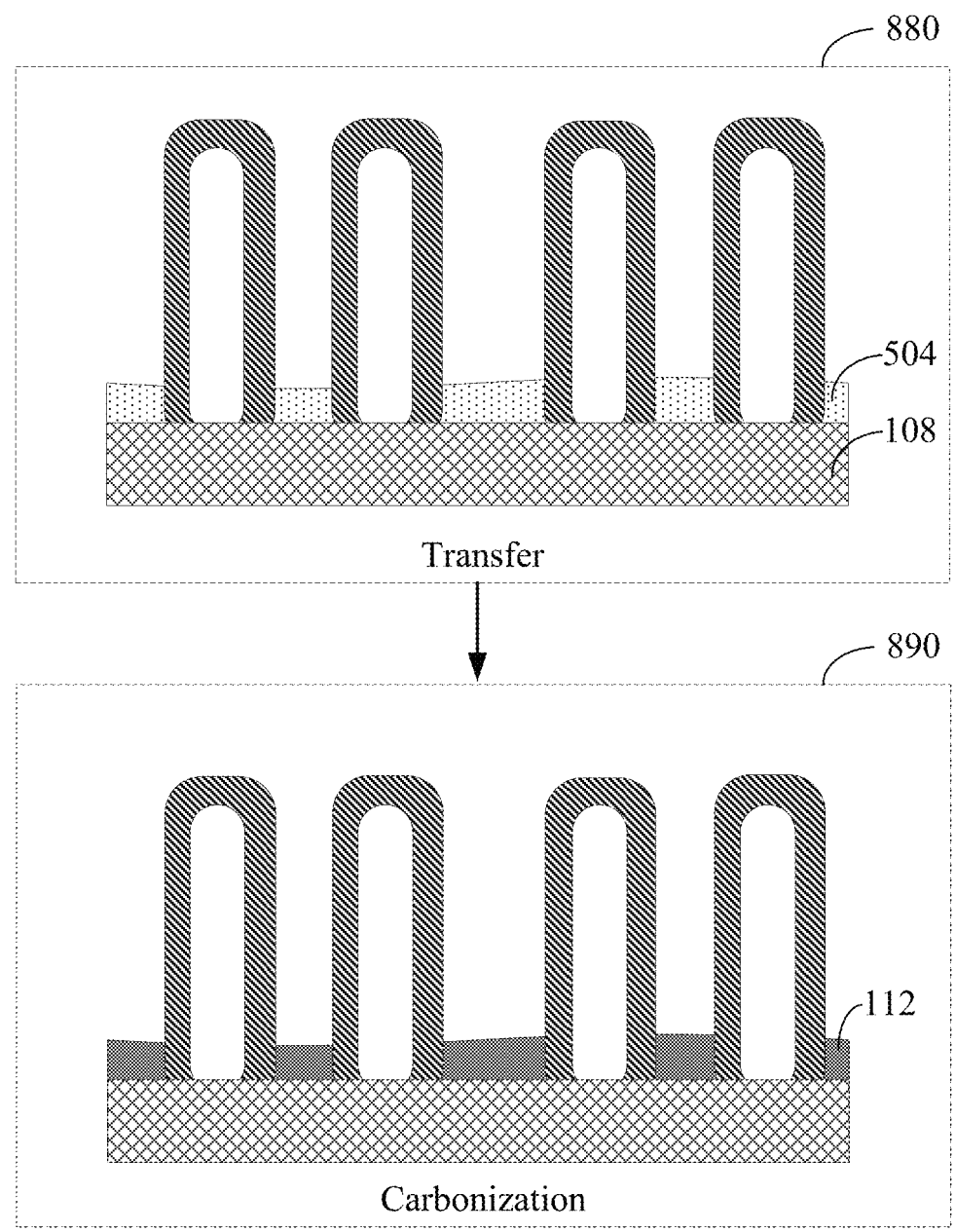

FIGS. 8A-8B are a graphical flow diagram illustrating another example process for forming a conductor-VACNT bonded structure with a functional layer according to still other embodiments of the present invention. In this example, the VACNT array 104 is separated from the initial CNT substrate 404 prior to transferring to the conductive layer 108, as discussed above but in contrast to the example fabrication in FIG. 5. Accordingly, the functional layer 210 deposition may again be performed prior to transferring the VACNT array 104 to the conductive layer 108, but after separating from the initial CNT substrate 404.

In particular, the initial CNT substrate 404 and VACNT array 104 grown thereon is provided (block 850) and then the VACNT array 104 is separated from the initial CNT substrate 404 (block 860). The separated VACNT array 104 is then coated with the desired functional layer 210 (block 870). The coated assembly may then be transferred (block 880) and carbonized (block 890) as desired, similar to the procedures described above with respect to FIG. 5.

When a composite or multi-layer functional coating 210/310 is employed (e.g., active material inner layer 210 and carbon outer layer 310), each functional coating 210/310 may be formed according to the methods above, combinations thereof, etc.

Figure 9:
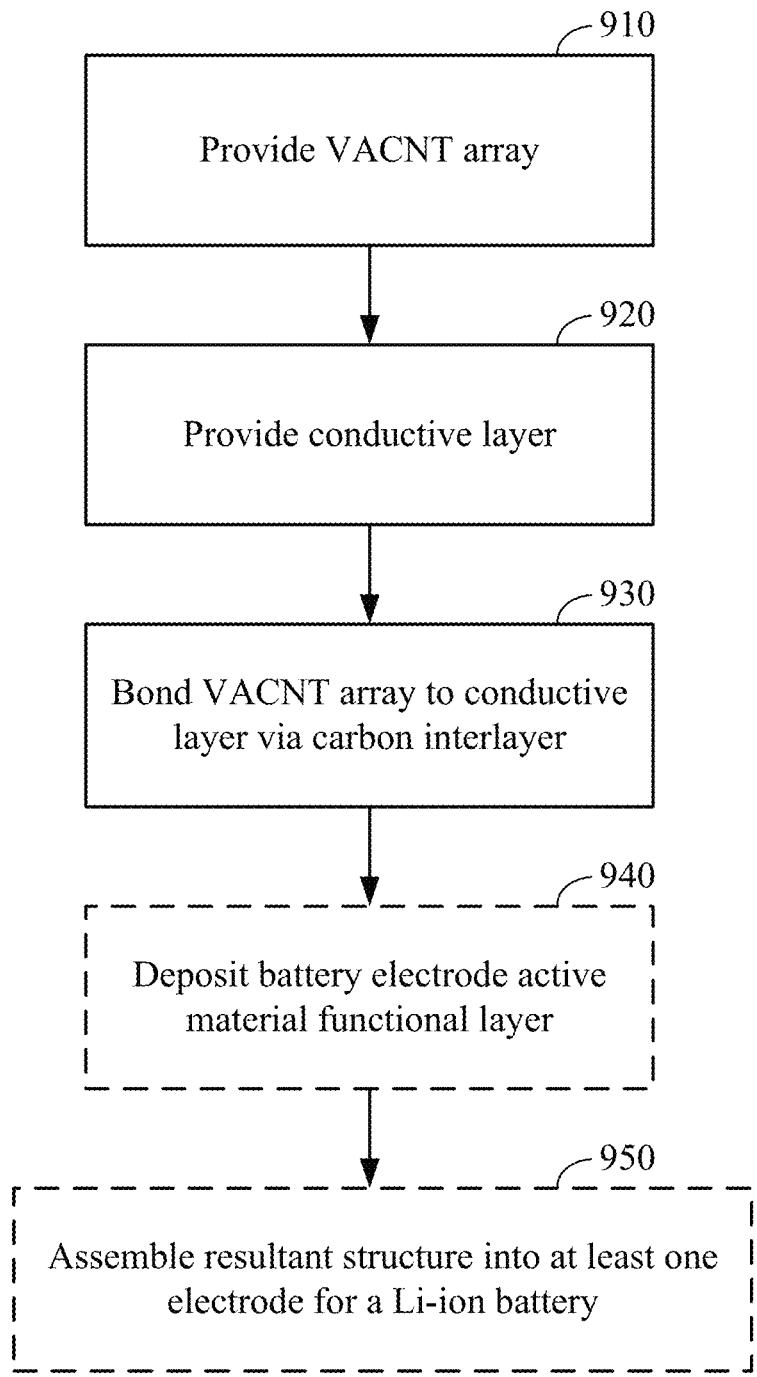
FIG. 9 is a process flow diagram illustrating an example method of manufacturing a material composition according to one or more embodiments.

FIG. 9 is a process flow diagram illustrating an example method of manufacturing a material composition according to one or more embodiments. In this example, a VACNT array is initially provided (step 910). A conductive layer is also provided (step 920). The VACNT array is then bonded to the conductive layer via a carbon interlayer (step 930), as discussed above. In some embodiments, a battery electrode active material functional layer may be deposited on the VACNT array (optional step 940), and/or the resultant structure may be assembled into at least one electrode for a Li-ion battery (optional step 950).

As discussed above, providing the VACNT array may include several substeps, such as providing a ceramic substrate, depositing catalyst nanoparticles on the substrate, growing the VACNT array from the catalyst nanoparticles, and oxidizing the interface between the VACNT array and the substrate. The ceramic substrate may be quartz or other suitable materials.

As further discussed above, bonding the VACNT array to the conductive layer may also include several substeps, such as applying a polymer layer to the conductive layer, disposing the VACNT array on the polymer layer, and carbonizing the polymer layer to form the carbon interlayer. In some embodiments, the VACNT array may be separated from the substrate after carbonizing the polymer layer, and, when desired, a battery electrode active material functional layer may be deposited on the VACNT array after separating the VACNT array from the substrate. In other embodiments, the VACNT array may be separated from the substrate prior to disposing the VACNT array on the polymer layer, and, when desired, a battery electrode active material functional layer may be deposited on the VACNT array after separating the VACNT array from the substrate but before disposing the VACNT array on the polymer layer.

FIGS. 10-16 show example characterizations of particular example embodiments. These examples are intended to further detail certain embodiments of the present invention for illustration purposes only, not to exemplify the full scope of the invention. A 1 millimeter thick VACNT electrode coated with silicon (Si) and a thin carbon (C) surface layer was fabricated for illustration purposes, and demonstrated a specific capacity in excess of 3000 mAh·g$^{-1}$ and a thermal conductivity in excess of 400 W·m$^{-1}$K$^{-1}$. Si was selected due to its high specific capacity and the growing interest in Si anode technology. The nano-dimensions of the Li—Si alloy coating reduced mechanical stresses. In addition, the pores remaining within the VACNT electrode provided for Si expansion during Li insertion, as discussed above. Accordingly, in contrast to conventional short VACNT-coated electrodes, the example VACNT-Si—C electrode exhibited dramatically enhanced stability.

Figures 10A, 10B, 10C, 10D, 10E, 10F, 10G:
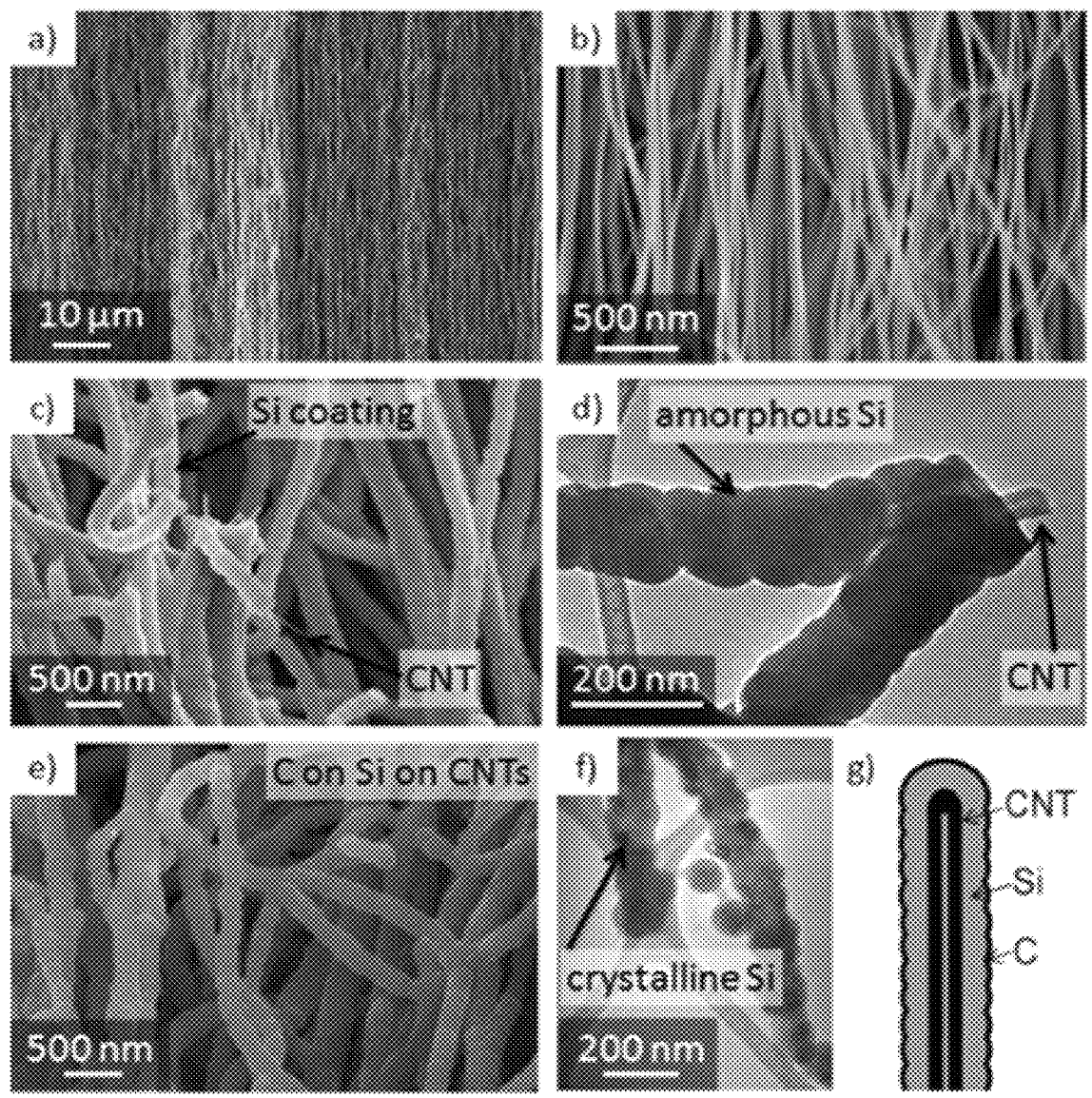
FIGS. 10A-10G illustrate the formation of an example VACNT-Si—C structure at various stages according to one embodiment.

FIGS. 10A-10G illustrate the formation of an example VACNT-Si—C structure at various stages according to one embodiment. In particular, FIGS. 10A, 10B, 10C, and 10E illustrate cross-sectional Scanning Electron Microscopy (SEM) images and FIGS. 10D and 10E illustrate cross-sectional Tunneling Electron Microscopy (TEM) images of (1) synthesized VACNTs, shown in FIGS. 10A and 10B, (2) Si coated VACNTs, shown in FIGS. 10C and 10D, and (3) C and Si coated VACNTs, shown in FIGS. 10E and 10F. A schematic of the final individual tube morphology is shown in FIG. 10G.

In this example, VACNTs were synthesized at 820° C. via a low pressure (10 Torr) chemical vapor deposition process (CVD) by using an iron (II) chloride catalyst and acetylene gas precursor. This method produces a high yield of VACNTs along the reaction chamber with measured growth rates in excess of approximately 0.1 mm·min$^{-1}$. In addition, this methodology does not require catalyst pre-deposition, which reduces the process cost and sample preparation time. The SEM images taken in cross-section show the high degree of alignment of the as-produced VACNTs at both low and high magnification (FIGS. 10A and 10B).

A nano-Si coating was deposited onto VACNT films by low pressure (1 Torr) decomposition of $SiH_4$. The representative SEM and TEM images show that the resulting Si forms a rather uniform 50 nm or so coating along the CNT length (FIGS. 10C and 10D). The deposited Si is amorphous, as indicated by the absence of crystallites in the TEM images (FIG. 10D).

Utilizing atmospheric pressure decomposition of $C_3H_6$ gas at 700° C., a thin C outer coating was deposited on the Si-coated VACNTs to improve high rate performance, stability, and solid electrolyte interphase (SEI) layer. The TEM images of the C and Si coated VACNTs show the formation of crystallites in the Si structure. A schematic illustrating the final morphology and composition of individual nanotubes within the VACNT film is shown in FIG. 10G. As discussed above, the final Si:C composition and thicknesses can be tailored by adjusting the reaction time for both deposition processes.

Figure 11A:
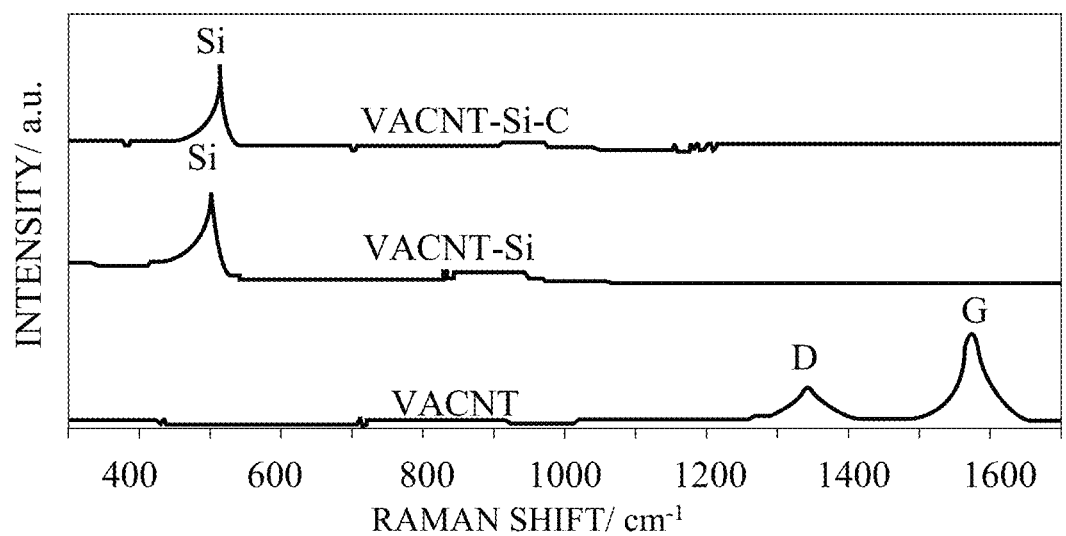
FIGS. 11A-11B illustrate example Raman spectroscopy (FIG. 11A) and X-ray diffraction (XRD) (FIG. 11B) characterization studies of the example VACNT-Si—C structure shown in FIGS. 10A-10G.
Figure 11B:
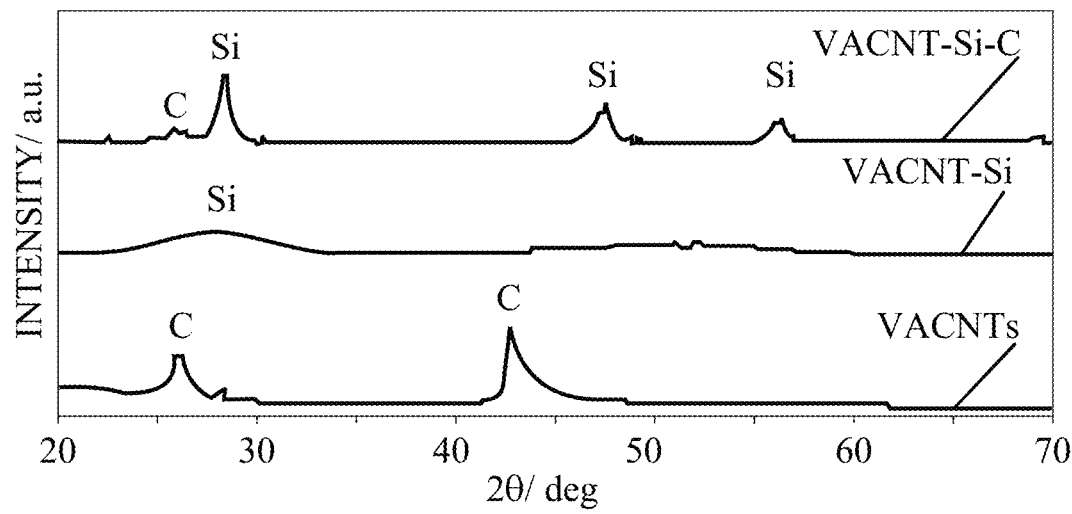

FIGS. 11A-11B illustrate example Raman spectroscopy (FIG. 11A) and X-ray diffraction (XRD) (FIG. 11B) characterization studies of the example VACNT-Si—C structure shown in FIGS. 10A-10G. The Raman spectra of the as-produced VACNTs showed the characteristic G and D peaks with a low D band intensity, thus indicating a small number of defects present. After Si deposition, a peak corresponding to Si emerged and the C peaks were greatly reduced (FIG. 11A), indicating uniform deposition throughout the film as observed by SEM and TEM (FIGS. 10C and 10D). After C coating, the Si band was still observable, however, the D and G bands reappeared, confirming deposition of a thin layer (FIG. 11A). The XRD pattern of the as-produced VACNTs showed peaks corresponding to graphitic materials. After Si coating, the distinct graphitic peaks were no longer visible, rather broad peaks attributed to amorphous Si were observed (FIG. 11B), in agreement with the TEM observations (FIG. 10D). Following C coating, the XRD pattern showed sharp peaks associated with crystalline Si and weaker peaks corresponding to C were visible (FIG. 11B).

Figure 12:
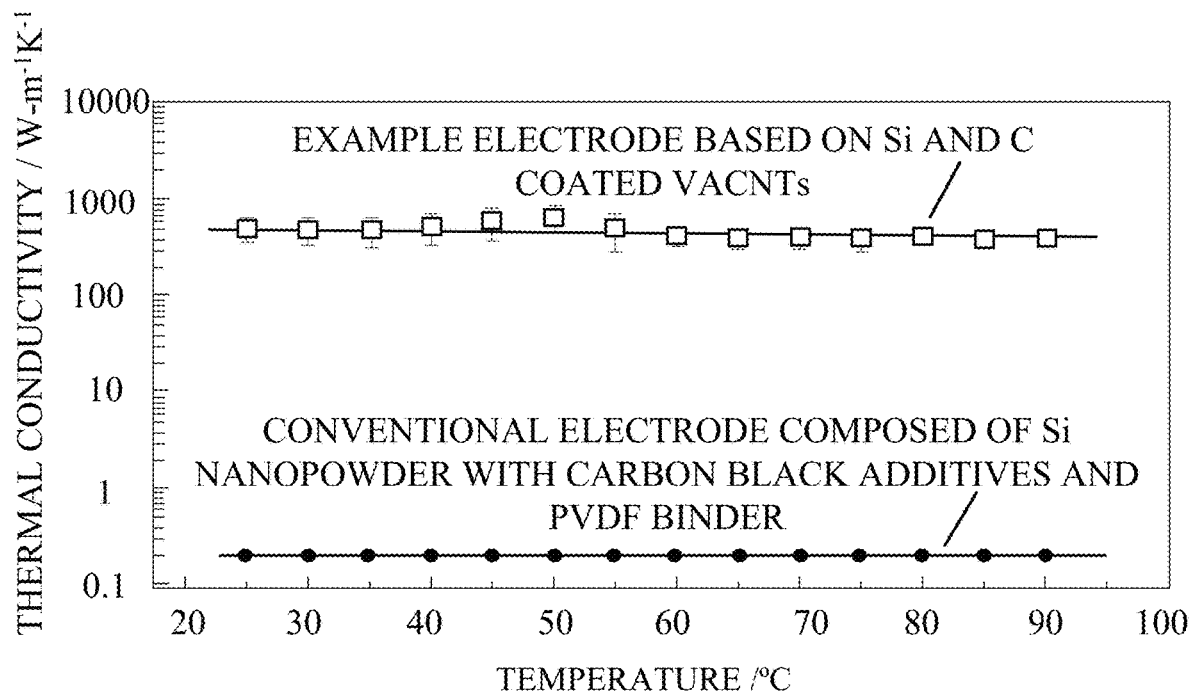
FIG. 12 illustrates a comparison of the thermal conductivities of conventional electrodes and example VACNT-Si—C thick electrodes.

FIG. 12 illustrates a comparison of the thermal conductivities of conventional electrodes and example VACNT-Si—C thick electrodes. The thermal conductivities of the example VACNT-Si—C electrodes were measured using a noncontact optical laser flash technique. According to established protocol, a xenon flash lamp produced shots with an energy of 10 J pulse on the sample surface while the temperature rise was measured at the other end with a nitrogen-cooled InSb infrared detector. The thermal-wave travel time allowed for the measurement of the thermal diffusivity α. The thermal conductivity K is related to α as K=αρC, where ρ and C are the mass density and specific heat of the material, respectively. Details of such an experimental setup and measurement methodology are well-known in the art. The system used for this characterization was calibrated with other techniques for measuring thermal conductivity, such as transient planar source and 3-omega techniques. The K values measured for given samples are associated with the thermal conductivity along the VACNT-Si—C length and perpendicular to the electrode plane.

Returning to FIG. 12, the particular results are shown for measurements of a VACNT-Si—C electrode and an electrode of similar thickness composed of densely packed Si (less than 80 nm) and carbon black powders (20 wt. % C) bonded with 10 wt. % polyvinylidene fluoride. While the selected Si reference electrodes with porosity insufficient to accommodate Si expansion upon electrochemical alloying with Li show rapid degradation, such a dense design was selected as a reference sample to obtain the highest thermal conductivity achievable by using conventional electrode preparation methods. The effective thermal conductivity K determined for the reference electrode was approximately 0.2 W·m$^{-1}$K$^{-1}$, while the example VACNT-Si—C electrode showed a three-order of magnitude improvement with K values in excess of 400 W·m$^{-1}$K$^{-1}$. The increase in K translates into approximately a 1000 times reduction of the thermal resistance t/K of the electrode, with t corresponding to the electrode thickness.

Major improvement in the thermal properties of the electrodes is therefore achievable according to embodiments herein by more effective use of the high intrinsic thermal conductivity of CNTs, which has been reported to exceed 2000 W·m$^{-1}$K$^{-1}$ and approach that of graphene. The high degree of multi-wall CNT alignment, their extension over the whole electrode thickness, and the C shell coating the Si surface also provide high thermal conductivity.

Figure 13:
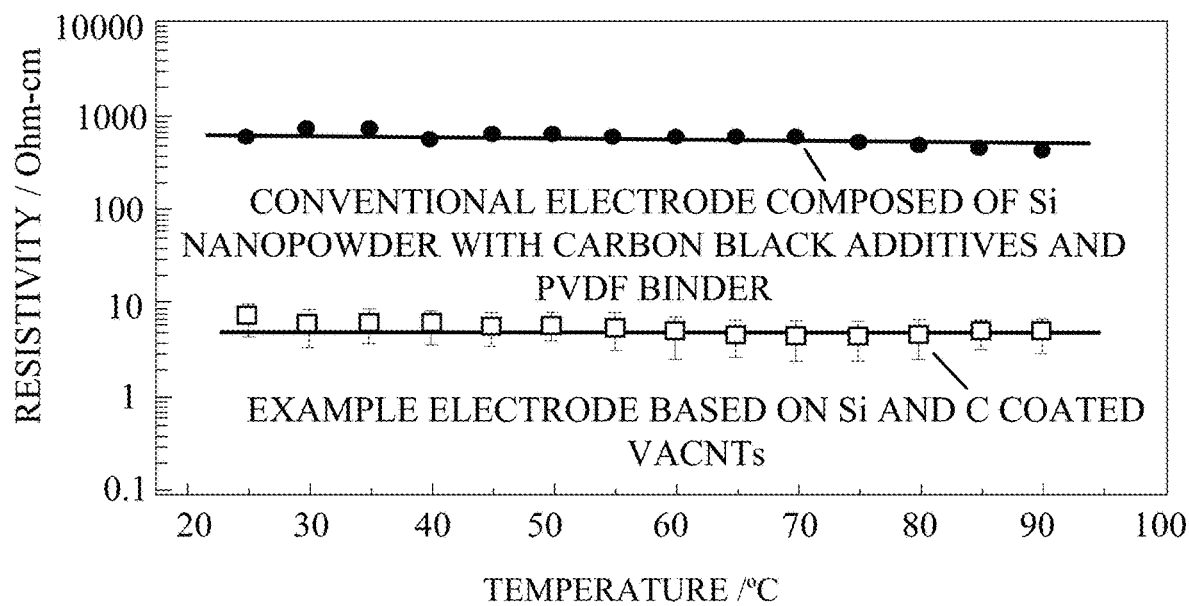
FIG. 13 illustrates the resistivity of an example VACNT-Si—C electrode.

FIG. 13 illustrates the resistivity of an example VACNT-Si—C electrode. Here, electrical measurements using a four-probe van der Pauw technique reveal approximately a 100 times reduction of the electrical resistance of the VACNT-based electrode.

Figure 14A:
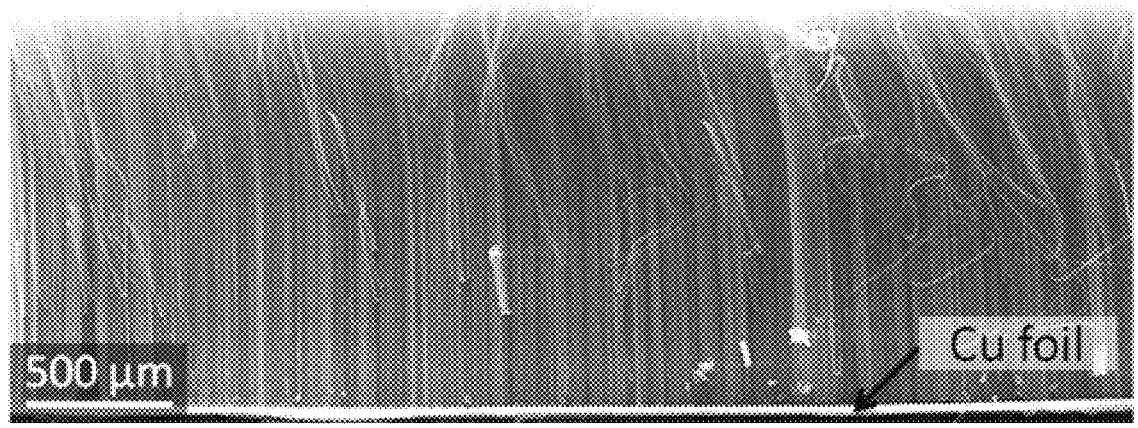
FIGS. 14A-14B illustrate an SEM image of a VACNT-based thick electrode adhered onto a thin copper foil (FIG. 14A) and dealloying capacity versus cycle number for the VACNT-Si—C electrode at three different current densities (FIG. 14B).
Figure 14B:
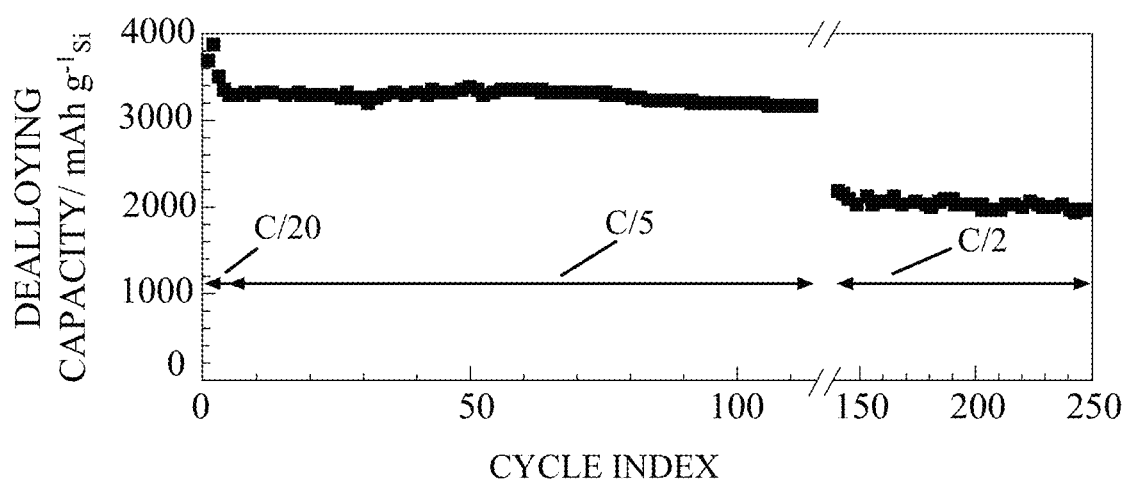

FIGS. 14A-14B illustrate an SEM image of a VACNT-based thick electrode adhered onto a thin copper foil (FIG. 14A) and dealloying capacity versus cycle number for the VACNT-Si—C electrode at three different current densities (FIG. 14B). The capacity is shown for the Si contribution only. Electrochemical measurements of the VACNT-Si—C electrode were performed in a 2016 coin cell configuration with a metallic Li foil counter electrode in the potential range of 0.01-1 V vs. Li/Li$^+$. Prior to cell assembly, the active materials were adhered to a thin copper foil (FIG. 14A) through thermal processes that created a conductive carbon interface with good adhesion. The VACNT-Si—C anode demonstrated very good stability for over 250 cycles (FIG. 14B) and a high specific capacity approaching theoretical limits (approximately 4200 mAh·g$_{Si}^{-1}$), which shows efficient electrical connectivity within the electrode and access of the electrolyte to all the deposited Si. The average values of dealloying capacities of the electrode at C/5 and C/2 were approximately 3300 mAh·g$_{Si}^{-1}$ and approximately 2000 mAh·g$_{Si}^{-1}$, respectively (FIG. 14B).

Figure 15A:
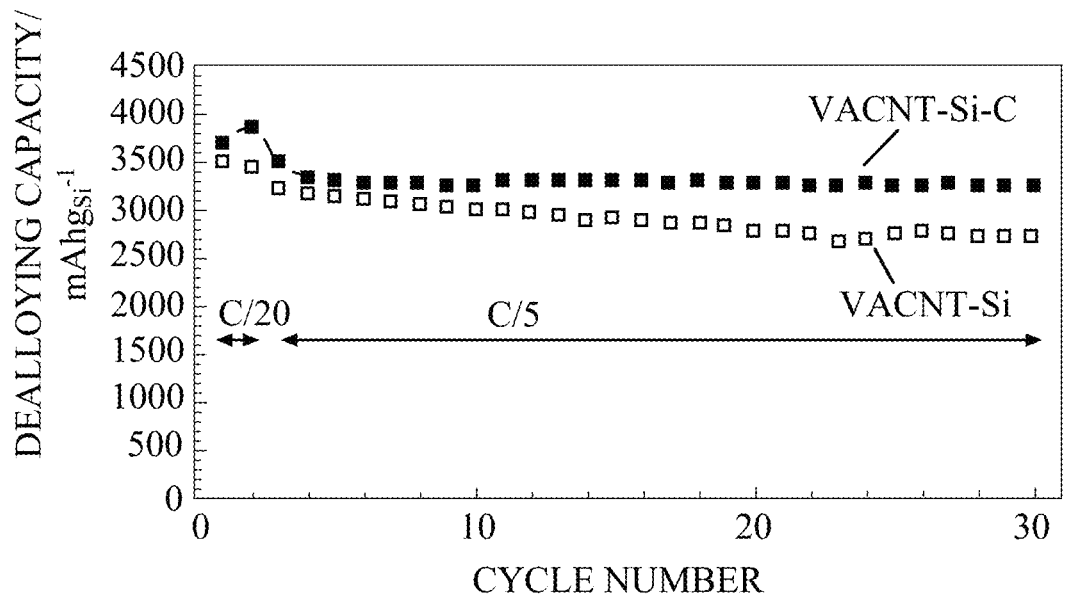
FIGS. 15A-15B illustrate an electrochemical characterization of example Si-coated VACNT electrodes, comparing designs with and without a protective outer C layer.
Figure 15B:
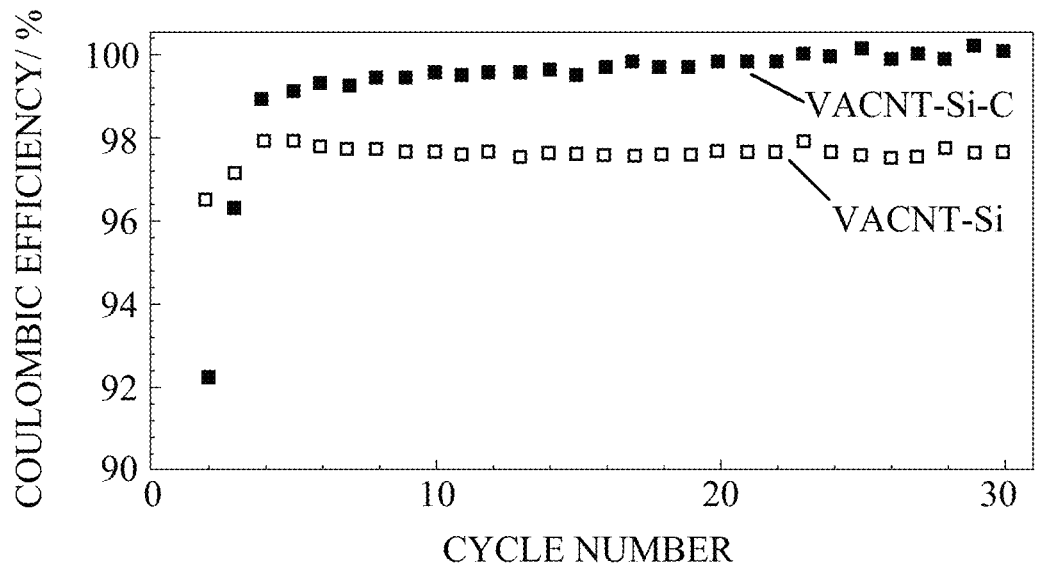

FIGS. 15A-15B illustrate an electrochemical characterization of example Si-coated VACNT electrodes, comparing designs with and without a protective outer C layer. While not essential for operation, it was found that the outer C coating on the Si surface provides better capacity retention and higher Coulombic Efficiencies (CE). Without the additional C layer, Si-coated VACNT electrodes showed a noticeable decline in specific capacity at a rate of approximately 1% per cycle (FIG. 15A). In addition, the unprotected Si showed relatively low values of CE at less than than 98% (FIG. 15B). In contrast, the example C-coated electrode showed CE steadily increasing close to 100% (FIG. 15B) and very stable performance with no signs of degradation (FIG. 15A).

Figure 16A:
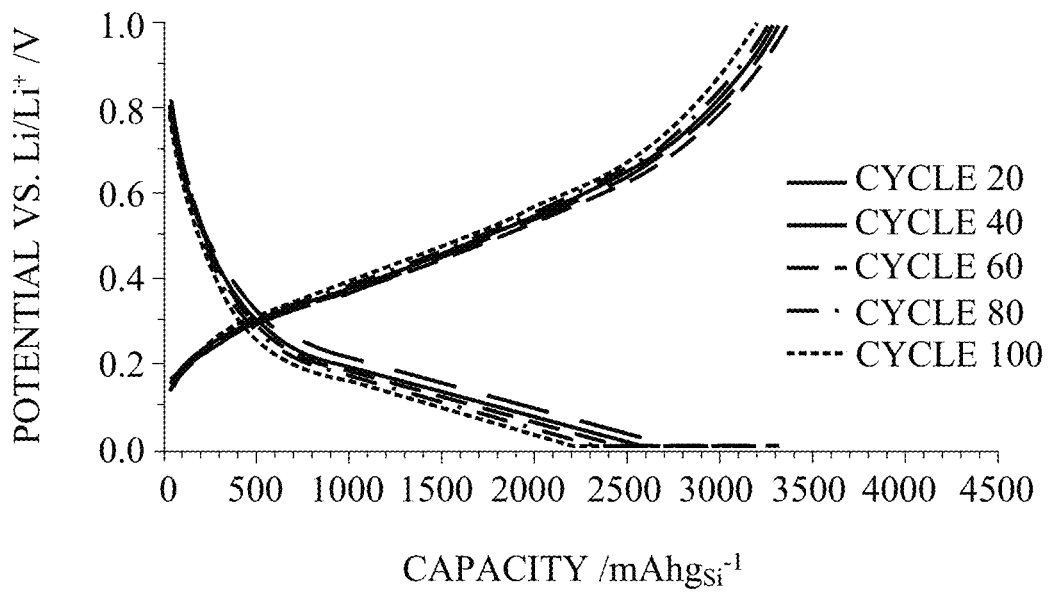
FIGS. 16A-16B illustrate another electrochemical characterization of example Si-coated VACNT electrodes with a protective outer C layer.
Figure 16B:
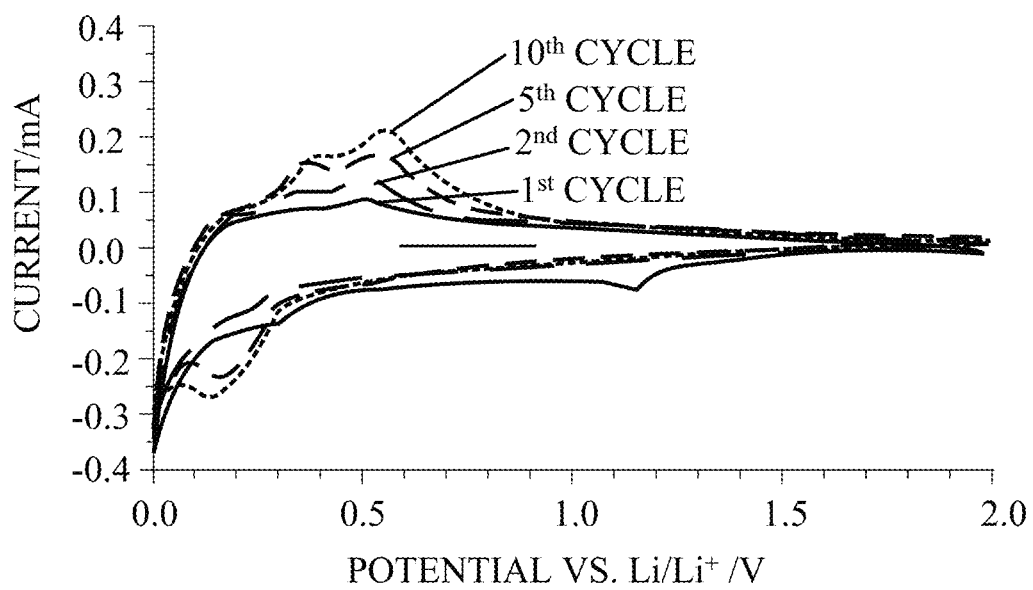

FIGS. 16A-16B illustrate another electrochemical characterization of example Si-coated VACNT electrodes with a protective outer C layer. The shape of the charge-discharge profiles (FIG. 16A) and cyclic voltammograms (FIG. 16B) of the example VACNT-Si—C electrode are similar to prior observations in various nanoSi-based anodes.

The observed rate capability of the example 1 mm thick electrode may be improved in other designs by patterning of the electrode (e.g., for the formation of small interpenetrating channels for faster electrolyte access) as well as the modification of the electrolyte solvent, which may further improve the high current/high power performance. In addition, the substitution of Li foil with an actual cathode may be used to further improve the rate capability.

Figure 17:
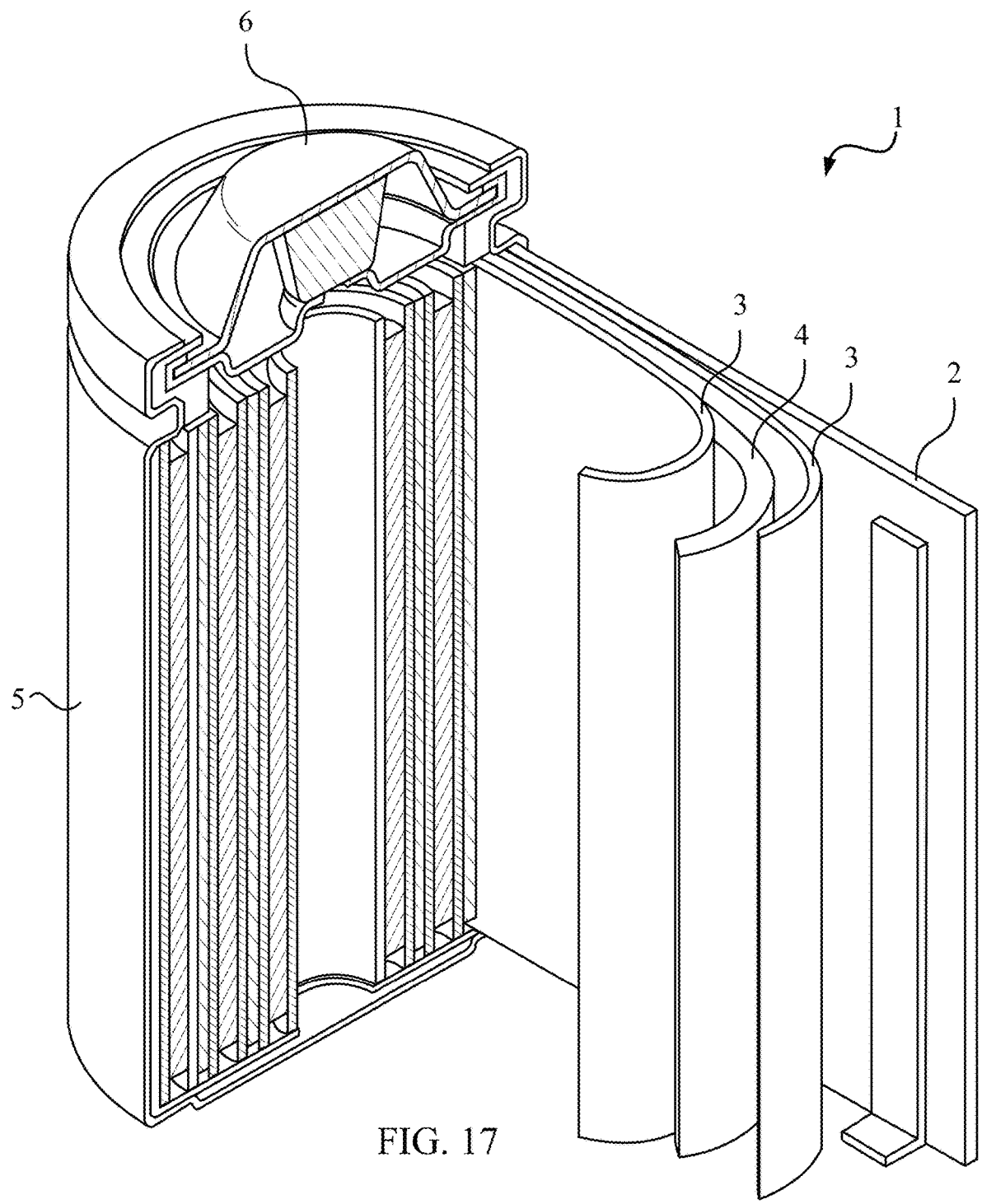
FIG. 17 illustrates an example Li-ion battery in which the above devices, methods, and other techniques, or combinations thereof, may be applied according to various embodiments.

FIG. 17 illustrates an example Li-ion battery in which the above devices, methods, and other techniques, or combinations thereof, may be applied according to various embodiments. A cylindrical battery is shown here for illustration purposes, but other types of arrangements, including prismatic or pouch (laminate-type) batteries, may also be used as desired. The example Li-ion battery 1 includes a negative anode 2, a positive cathode 3, a separator 4 interposed between the anode 2 and the cathode 3, an electrolyte impregnating the separator 4, a battery case 5, and a sealing member 6 sealing the battery case 5. The example Li-ion battery 1 may simultaneously embody one or multiple aspects of the present invention in various designs.

As discussed above, development of high energy density, long-lasting Li-ion batteries is desirable for portable applications, such as electronics and electric vehicles. Both increasing the specific capacity of the battery electrodes and minimizing the relative weight and volume of inactive components (separators and metal foils) by increasing the thickness of electrodes from the currently used 50-100 μm to hundreds of micrometers and above are attractive routes in this regard, and may be achieved according to various embodiments herein.

The preceding description is provided to enable any person skilled in the art to make or use embodiments of the present invention. It will be appreciated, however, that the present invention is not limited to the particular formulations, process steps, and materials disclosed herein, as various modifications to these embodiments within the scope of the claims will be readily apparent to those skilled in the art. That is, the generic principles defined herein may be applied to other embodiments without departing from the spirit or scope of the invention, which should only be defined by the following claims and all equivalents.

The invention claimed is:

1. A battery electrode composition, comprising:
an active material coating including an active material, the active material comprising one or more of silicon, tin, germanium, phosphorous, sulfur, a sulfide, a fluoride, a silicate, or any combination thereof;

a metal-comprising, electrically conductive current collector; and an electrically conductive, carbon-comprising or polymer-comprising interlayer separate from the active material coating and coupling the active material coating to the electrically conductive current collector.

2. The battery electrode composition of claim 1, wherein the active material coating exhibits a specific capacity greater than about 3000 mAh/g.

3. The battery electrode composition of claim 1, wherein the active material coating comprises a battery electrode active material functional layer.

4. The battery electrode composition of claim 3, wherein the battery electrode active material functional layer comprises a silicon-based active material, and wherein the battery electrode composition is operable in a Li-ion battery.

5. The battery electrode composition of claim 3, wherein the battery electrode active material functional layer comprises active material particles that comprise the one or more of silicon, tin, germanium, phosphorous, sulfur, a sulfide, a fluoride, a silicate, or any combination thereof.

6. The battery electrode composition of claim 1, wherein the active material coating comprises a thermally conductive material.

7. The battery electrode composition of claim 1, wherein the active material coating comprises carbon nanotubes.

8. The battery electrode composition of claim 7, wherein the carbon nanotubes are arranged as a vertically aligned carbon nanotube (VACNT) array.

9. The battery electrode composition of claim 1, wherein the active material coating comprises carbon nanotubes and a battery electrode active material functional layer.

10. The battery electrode composition of claim 1, wherein the electrically conductive current collector comprises copper.

11. The battery electrode composition of claim 1, wherein the electrically conductive current collector comprises nickel.

12. The battery electrode composition of claim 1, wherein the electrically conductive, carbon-comprising or polymer-comprising interlayer comprises carbon.

13. The battery electrode composition of claim 1, wherein the electrically conductive, carbon-comprising or polymer-comprising interlayer comprises one or more polymers.

14. The battery electrode composition of claim 13, wherein the one or more polymers comprise polyvinylidene difluoride (PVDF).

15. The battery electrode composition of claim 1, wherein the electrically conductive, carbon-comprising or polymer-comprising interlayer comprises carbon and one or more polymers.

16. The battery electrode composition of claim 1, wherein the electrically conductive, carbon-comprising or polymer-comprising interlayer does not comprise the active material.

17. The battery electrode composition of claim 1, wherein the electrically conductive, carbon-comprising or polymer-comprising interlayer is interspersed with the active material coating.

18. The battery electrode composition of claim 16, wherein the electrically conductive, carbon-comprising or polymer-comprising interlayer comprises electrically conductive fibrous material interspersed with the active material coating.

* * * * *